United States Patent
Minoura

(10) Patent No.: US 12,147,225 B2
(45) Date of Patent: Nov. 19, 2024

(54) DEVICE CONTROL APPARATUS AND METHOD

(71) Applicant: TOSHIBA TEC KABUSHIKI KAISHA, Tokyo (JP)

(72) Inventor: Yusuke Minoura, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 433 days.

(21) Appl. No.: 17/530,794

(22) Filed: Nov. 19, 2021

(65) Prior Publication Data

US 2022/0253020 A1 Aug. 11, 2022

(30) Foreign Application Priority Data

Feb. 5, 2021 (JP) .................. 2021-017593

(51) Int. Cl.
*G05B 9/02* (2006.01)
*G06Q 20/20* (2012.01)

(52) U.S. Cl.
CPC ............... *G05B 9/02* (2013.01); *G06Q 20/20* (2013.01)

(58) Field of Classification Search
CPC .......... G05B 9/02; G06Q 20/20; G07F 19/209
See application file for complete search history.

(56) References Cited

U.S. PATENT DOCUMENTS

| | | | |
|---|---|---|---|
| 2011/0228319 A1* | 9/2011 | Miyazawa | G06F 3/1259 358/1.15 |
| 2012/0212771 A1* | 8/2012 | Goddard | G06F 3/1255 358/1.15 |
| 2016/0239819 A1* | 8/2016 | Yamada | G06Q 20/209 |
| 2019/0361651 A1 | 11/2019 | Wang et al. | |

* cited by examiner

*Primary Examiner* — Ziaul Karim
(74) *Attorney, Agent, or Firm* — Foley & Lardner LLP

(57) ABSTRACT

To reduce a load on a client terminal that uses a device under control. A first control unit operates the device in response to a device use request from the client terminal. A detection unit detects a failure of the device. A transfer unit transfers, when a failure is detected in an operating device under control of the first control unit, the device use request from the client terminal to another device control apparatus connected via the network. A second control unit operates, when the device use request is received from the other device control apparatus via the communication interface, the device in response to the request.

12 Claims, 8 Drawing Sheets

DEVICE CONTROL APPARATUS AND METHOD

CROSS-REFERENCE TO RELATED APPLICATION

This application is based upon and claims the benefit of priority from Japanese Patent Application No. 2021-017593, filed on Feb. 5, 2021, the entire contents of which are incorporated herein by reference.

FIELD

Embodiments described herein relate to a device control apparatus and a method for causing a computer to function as the device control apparatus.

BACKGROUND

In recent years, a device control system is widely used in which a device control apparatus to which computer peripheral devices such as a printer, a display, and a scanner, that is, devices that are locally connected is connected to a network, and a plurality of client terminals share a device connected to the device control apparatus via the network. Since the device control system can reduce the number of devices as compared with the number of client terminals, there is an advantage that the equipment cost can be reduced.

In such a device control system, when a failure occurs in a device that a client terminal attempts to use, an error is returned to the client terminal from a device control apparatus that controls the device. Therefore, the client terminal that confirms the error requests the use of the device by designating, for example, another device control apparatus, which results in a large load.

DETAILED DESCRIPTION

In general, according to at least one embodiment, a device control apparatus and a method therefor capable of reducing a load on a client terminal that uses a device under control are provided.

According to at least one embodiment, a device control apparatus includes: a communication interface; a device interface; a first control unit (controller); a detection unit (detector); a transfer circuit; and a second controller. The communication interface is connected to one or more client terminals via a network. The device interface is locally connected to at least one device. The first control unit operates the device in response to a device use request from the client terminal. The detection unit detects a failure of the device. The transfer unit transfers, when a failure is detected in an operating device under control of the first control unit, the device use request from the client terminal to another device control apparatus connected via the network. The second control unit operates, when the device use request is received from the other device control apparatus via the communication interface, the device in response to the request.

Hereinafter, at least one embodiment of a device control apparatus and a program thereof will be described with reference to the drawings.

[Description of Device Control System]

Figure 1:
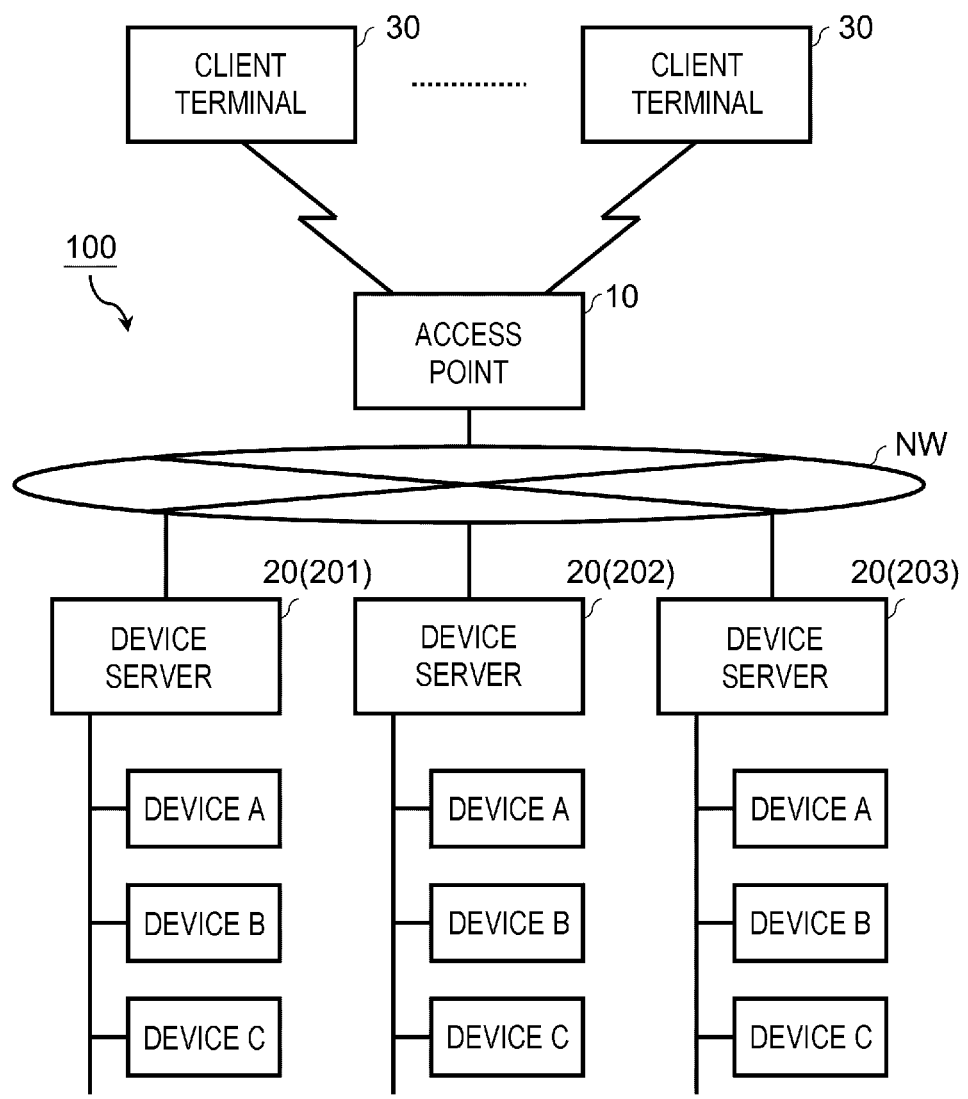
FIG. 1 is a schematic configuration diagram of a device control system according to at least one embodiment.

FIG. 1 is a schematic configuration diagram of a device control system 100 according to at least one embodiment. The device control system 100 includes an access point 10 and a device server 20 connected to a network NW. The network NW is Internet, a wide area network (WAN), or a local area network (LAN). The network NW may be a wired line or a wireless line. The network NW may include both a wired line and a wireless line.

The access point 10 is a communication facility disposed in a main place as a relay base when data communication is performed between the device server 20 connected to the network NW and one or more client terminals 30 via a wireless LAN. The wireless LAN conforms to, for example, the Wi-Fi (registered trademark) standard. Although only one access point 10 is illustrated in FIG. 1, the number of access points 10 is not limited to one. Two or more access points 10 may be connected to the network NW in consideration of a scale, a layout, or the like of a facility.

The device server 20 is a computer device that locally connects and controls computer peripheral devices, that is, devices. The device server 20 is an embodiment of a device control apparatus. The device control system 100 includes two or more device servers 20 connected to the network NW. In at least one embodiment, three device servers 20 are connected to the network NW. Hereinafter, the three device servers 20 are referred to as a device server 201, a device server 202, and a device server 203 as necessary.

Each device server 20 locally connects and controls each device. The device controlled by each device server 20 is not limited to one type. Each device server 20 may locally connect and control two or more types of devices. In the present embodiment, a case where each device server 20 locally connects and controls three devices, that is, a device A, a device B, and a device C, will be described as an example. For example, the device A is a printer, the device B is an IC card reader, and the device C is an automatic coin dispensing machine. The types of devices are not limited to the above three types.

The client terminal 30 is a computer terminal capable of requesting the device server 20 connected via the network NW to perform processing and receiving a service from the device server 20. The client terminal 30 is a terminal capable of transmitting and receiving a message to and from the device server 20 by a publish and subscribe method. The client terminal 30 includes an input device and a display device. Further, the client terminal 30 incorporates a wireless circuit. For example, a tablet terminal, a smartphone, a notebook computer, or the like may be the client terminal 30. Further, the client terminal 30 may be a stationary computer terminal.

[Description of Device Server]

Figure 2:
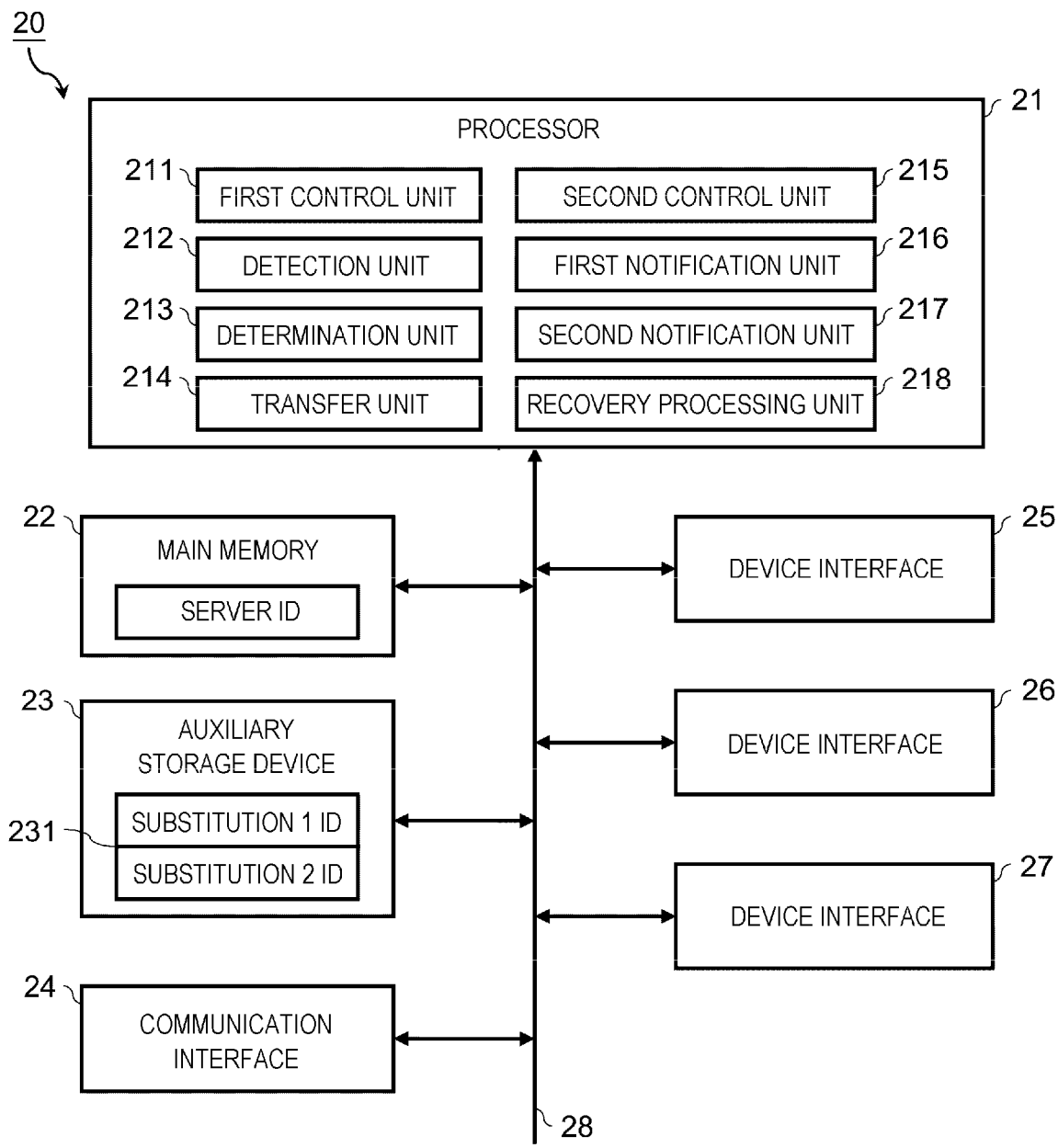
FIG. 2 is a block diagram illustrating a main circuit configuration of a device server.

FIG. 2 is a block diagram illustrating a main circuit configuration of the device server 20. The device server 20 includes a processor 21, a main memory 22, an auxiliary storage device 23, a communication interface 24, a plurality of device interfaces 25, 26, and 27, and a system bus 28. Then, the device server 20 connects the processor 21, the main memory 22, the auxiliary storage device 23, the communication interface 24, and the device interfaces 25, 26, and 27 to the system bus 28 directly or via a signal input and output circuit. Thus, the device server 20 forms a computer by the processor 21, the main memory 22, the auxiliary storage device 23, and the system bus 28 connecting the processor 21, the main memory 22, and the auxiliary storage device 23.

The processor 21 corresponds to a central unit of the computer. The processor 21 controls each unit to realize various functions as the device server 20 in accordance with an operating system, an application program, or the like. The processor 21 is, for example, a central processing unit (CPU).

The main memory 22 corresponds to a main storage unit of the computer. The main memory 22 includes a nonvolatile memory area and a volatile memory area. The main memory 22 stores programs such as an operating system and an application program in the nonvolatile memory area. Further, the main memory 22 may store data necessary for the processor 21 to execute processing for controlling each unit in the nonvolatile or volatile memory area. The main memory 22 uses the volatile memory area as a work area in which data is appropriately rewritten by the processor 21. The nonvolatile memory area is, for example, a read only memory (ROM). The volatile memory area is, for example, a random access memory (RAM).

The auxiliary storage device 23 corresponds to an auxiliary storage unit of the computer. For example, an electrically erasable programmable read-only memory (EEPROM), a hard disk drive (HDD), a solid state drive (SSD), or the like is used as the auxiliary storage device 23. The auxiliary storage device 23 stores data used when the processor 21 performs various types of processing, or data generated by the processing in the processor 21. The auxiliary storage device 23 may store the application program.

The communication interface 24 connects the network NW. The communication interface 24 performs data communication with other devices connected to the network NW according to a predetermined communication protocol. The other devices are typically the client terminal 30 and the other device server 20 connected via the access point 10. The other device includes a device other than the client terminal 30 or the other device server 20.

The device interfaces 25, 26, and 27 connect to the device A, the device B, and the device C, respectively. For example, the device interface 25 connects to the device A by a communication cable, the device interface 26 connects to the device B by a communication cable, and the device interface 27 connects to the device C by a communication cable. The device A, the device B, and the device C may be externally attached to the device server 20 or may be incorporated in the device server 20.

The device server 20 stores a server ID in the nonvolatile memory area of the main memory 22. The server ID is identification information uniquely set for each device server 20 in order to individually identify each device server 20.

The device server 20 uses a part of a storage area of the auxiliary storage device 23 as an area of a substitution table 231. The substitution table 231 is a data table in which the server IDs of the other device servers 20 are stored in descending order of priority. In the present embodiment, the priority of the other device servers 20 is determined in ascending order of a physical distance from the own device server 20.

For example, when the device server 202 is closer in the physical distance to the device server 201 than the device server 203, in the substitution table 231 of the device server 201, the server ID of the device server 202 is set as a substitution ID having the first priority, and the server ID of the device server 203 is set as a substitution ID having the second priority. For example, when the device server 203 is closer in the physical distance to the device server 202 than the device server 201, in the substitution table 231 of the device server 202, the server ID of the device server 203 is set as a substitution ID having the first priority, and the server ID of the device server 201 is set as a substitution ID having the second priority. In this case, since the device server 202 is closer in physical distance to the device server 203 than the device server 201, in the substitution table 231 of the device server 203, the server ID of the device server 202 is set as a substitution ID having the first priority, and the server ID of the device server 201 is set as a substitution ID having the second priority.

In the device server 20, a control program is implemented such that the processor 21 has functions of a first control unit 211 (controller), a detection unit 212 (detector), a determination unit 213 (processor), a transfer unit 214 (transfer circuit, a second control unit 215 (controller), a first notification unit 216 (notifier), a second notification unit 217 (notifier), and a recovery processing unit 218 (processor).

The control program is installed in, for example, the auxiliary storage device 23. The control program may be installed in, for example, the main memory 22. A method of installing the control program in the main memory 22 or the auxiliary storage device 23 is not particularly limited. The control program can be installed in the main memory 22 or the auxiliary storage device 23 by recording the control program in a removable recording medium or distributing the control program by communication via a network. A form of the recording medium is not limited as long as the recording medium can store a program such as a CD-ROM or a memory card and can be read by the apparatus.

The first control unit 211 has a function of controlling the device interface 25, 26, or 27 to operate a device to be used in response to a request when a signal of a device use request is received from the client terminal 30 via the communication interface 24. The first control unit 211 can be referred to as a first control means.

The detection unit 212 has a function of detecting a failure of an operating device by the function of the first control unit 211. For example, when the device is a printer, a paper jam error, a paper out error, or the like is detected as a failure of an operating device. For example, when the device is an automatic coin dispensing machine, a coin jam error, a coin shortage error, or the like is detected as a failure of an operating device. The detection unit 212 can be referred to as a detection means.

The determination unit 213 has a function of determining, when a failure is detected in an operating device by the function of the detection unit 212, one device server 20 satisfying a predetermined condition from the other device servers 20. The predetermined condition is, for example, a short physical distance. In at least one embodiment, as described above, the priorities of the other device servers 20 are set in ascending order of the physical distance from the own device server 20, and the server IDs of the other device servers 20 are set in descending order of the priorities in the substitution table 231. Therefore, the determination unit 213 first determines a device server 20 having first priority. Then, when the device is unavailable in the device server 20, a device server 20 having second priority is determined. Incidentally, when the device is already in operation or is in failure, the device is unavailable. Further, even when the device is not placed under the control of the device server 20, the device is unavailable. The determination unit 213 can be referred to as a determination means.

The transfer unit 214 has a function of transferring a signal of the device use request from the client terminal 30 to the device server 20 via the network NW, when a failure is detected in an operating device by the function of the detection unit 212 and one device server 20 satisfying the predetermined condition is determined by the determination unit 213. The transfer unit 214 can be referred to as a transfer means.

The second control unit 215 has a function of controlling the device interface 25, 26, or 27 to which the corresponding device is connected to operate the device in response to a request when a signal of a device use request is received from the other device server 20 via the network NW. The second control unit 215 can be referred to as a second control means.

The first notification unit 216 has a function of, when the operation of the device under the control of the second control unit 215 is completed, transmitting, via the network NW, a signal indicating an operation completion notification of the device to the other device server 20, which is a signal transfer source of the device use request. The first notification unit 216 can be referred to as a first notification means.

The second notification unit 217 has a function of transmitting, when the signal indicating the operation completion notification of the device is received from the other device server 20 via the network NW, the signal indicating the operation completion notification of the device together with, for example, a server ID as information specifying the other device server 20 to the client terminal 30 via the network NW. The second notification unit 217 can be referred to as a second notification means.

As described above, by transmitting the information specifying the device server 20, in which the operation of the device is completed, together with the signal indicating the operation completion notification, the client terminal 30 that receives the information can recognize that processing corresponding to the request is executed by the device under the control of the other device server 20, which is different from the device server 20 in which the device use request is performed. Then, the client terminal 30 displays information capable of specifying the other device server 20 on a display device, and therefore, a user of the client terminal 30 can know that the processing corresponding to the request is executed by a device different from a preset device to be used.

The recovery processing unit 218 (processor) has a function of executing recovery processing for invalidating an operation of a device under the control of the first control unit 211 when the device in which the failure is detected is recovered. The recovery processing unit 218 can be referred to as a recovery processing means.

For example, when a paper jam error, a paper out error, or the like occurs in a printer, print data received from the device server 20 before an error occurs is stored in a print buffer of the printer. If the printer is recovered from the failure in this state, the print data may be printed. Therefore, the device server 20 controls the printer such that the print buffer is cleared. Further, in the printer, a printed matter before an error occurs may remain. Therefore, the device server 20 controls the printer such that printing indicating that the immediately preceding printed matter is invalid is performed. Processing of executing such control is recovery processing for the printer.

For example, when a coin jam error, a coin shortage error, or the like occurs in an automatic coin dispensing machine, coin data received from the device server 20 before an error occurs is stored in a data buffer of the automatic coin dispensing machine. If the automatic coin dispensing machine is recovered from the failure in this state, coins may be dispensed according to the coin data. Therefore, the device server 20 controls the automatic coin dispensing machine such that a coin buffer is cleared. Further, in the automatic coin dispensing machine, coins or bills dispensed before an error occurs may remain. Therefore, the device server 20 controls the automatic coin dispensing machine such that a warning indicating that the immediately preceding dispensed coins or bills are invalid is displayed or output by voice. The processing of executing such control is recovery processing for the automatic coin dispensing machine.

[Operation Description of Device Server]

Figure 3:
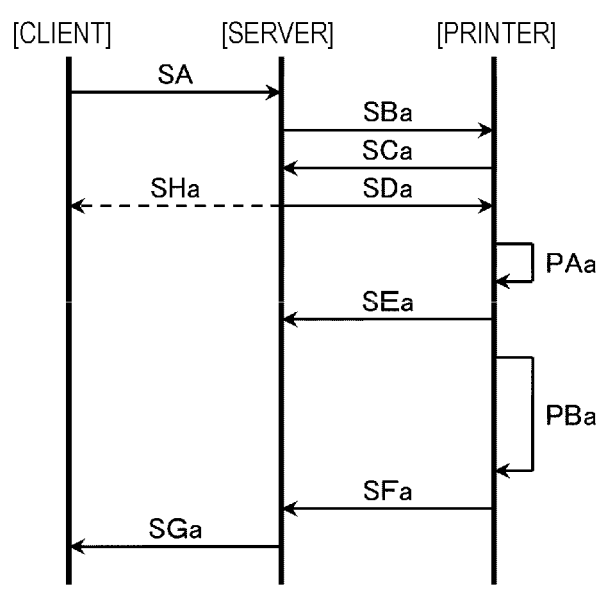
FIG. 3 is a sequence diagram of main signals transmitted and received between a client terminal and the device server.
Figure 4:
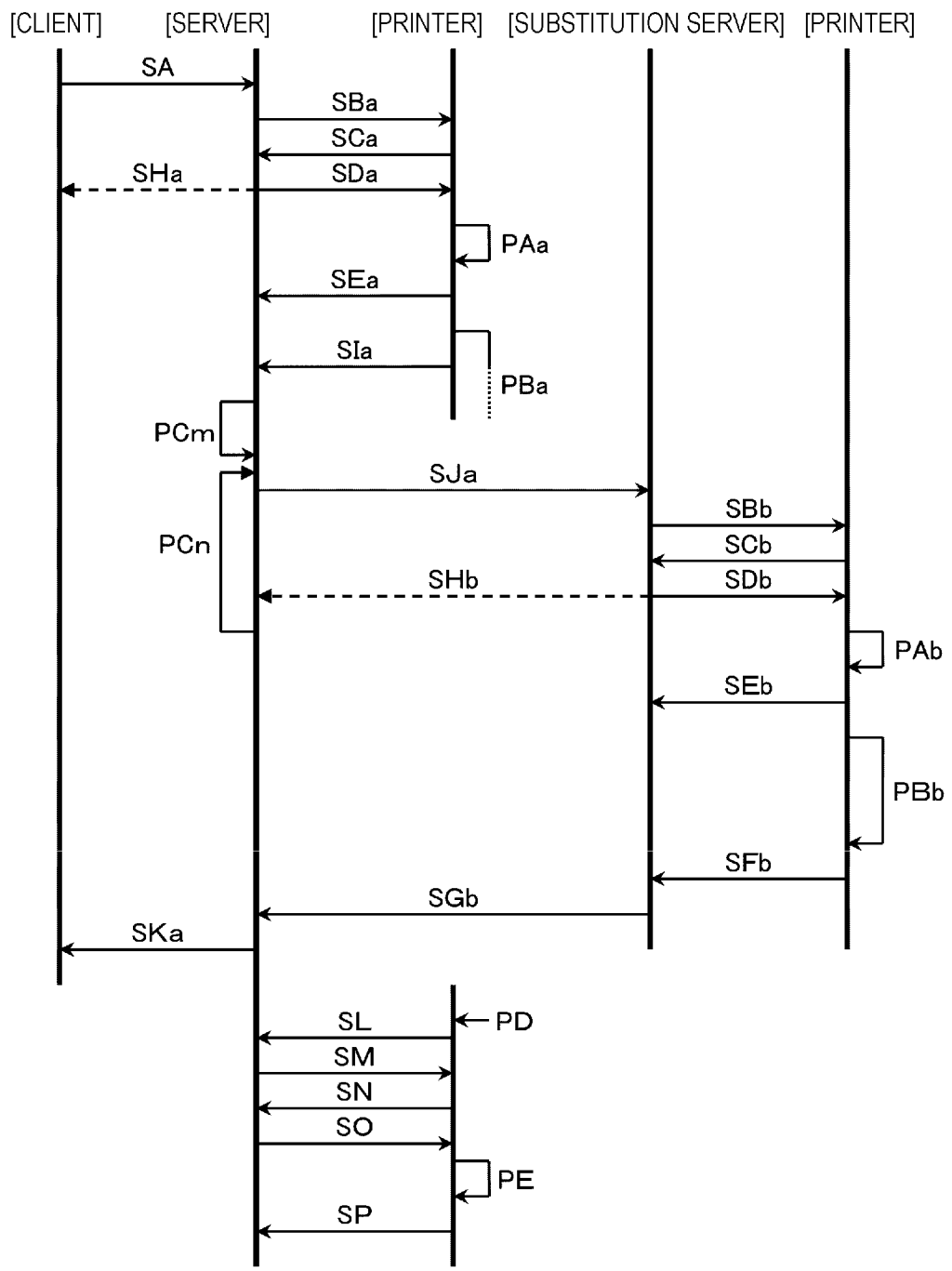
FIG. 4 is a sequence diagram of main signals transmitted and received between the client terminal and the device server.

FIGS. 3 and 4 are sequence diagrams of main signals transmitted and received between the client terminal 30 and the device server 20. FIGS. 5 to 8 are flowcharts illustrating a procedure of main information processing executed by the processor 21 of the device server 20 according to the control program. Hereinafter, the operation of the device server 20 will be described using each unit. The sequence diagrams and the flowcharts illustrate an example. The sequence or procedure can be changed as appropriate as long as the same operation and effect are obtained.

Here, for convenience of description, the client terminal 30 is a tablet terminal in which a Point Of Sales (POS) application program is implemented. Then, it is assumed that commercial transaction is settled in the client terminal 30 and a receipt indicating a transaction content is issued. In this case, the client terminal 30 issues a print request to any one of the device servers, for example, the device server 201. When the request is received, the device server 201 controls, for example, a printer connected to the device interface 25 to print the receipt.

FIG. 3 is a sequence diagram when a device (printer) under the control of the device server 201 normally operates in response to a request (print request) from the client terminal 30. First, the client terminal 30 transmits a print request signal SA as a signal of a device use request to the device server 201. The print request signal SA is sent to the device server 201 via the network NW. The print request signal SA includes print data.

In response to the print request signal SA, the device server 201 outputs an inquiry signal SBa from the device interface 25 to the printer. Upon receiving the inquiry signal SBa, the printer outputs a response signal SCa to the inquiry to the device server 201. Specifically, the printer outputs a permission response signal SCa when the printer is neither in failure nor in operation. When the printer is in failure or in operation, the printer outputs a response signal SCa indicating an error.

When the response signal SCa indicating an error is received from the printer, the device server 201 transmits a response signal SHa indicating a request failure to the client terminal 30, which is a transmission source of the print request signal SA.

When the permission response signal SCa is received from the printer, the device server 201 outputs a print method signal SDa from the device interface 25 to the printer. The print method signal SDa includes print data. The printer stores the print data in the print buffer as processing PAa. Then, when the printer finishes storing the print data in the print buffer, the printer outputs an event notification signal SEa indicating the start of the printing to the device server 201. Further, the printer executes printing of the print data stored in the print buffer as processing PBa.

When the printer normally ends the printing, the printer outputs an event notification signal SFa indicating the end of the printing to the device server 201. Upon receiving the event notification signal SFa, the device server 201 transmits a response signal SGa indicating success of a request to the client terminal 30, which is the transmission source of the print request signal SA.

Upon receiving the response signal SGa indicating the success of the request, the client terminal 30 notifies that the printing is executed by the printer under the control of the device server 201. Therefore, the user of the client terminal 30 can know that the receipt is printed from the printer under the control of the device server 201.

The above is a sequence when the device (printer) under the control of the device server 201 normally operates in response to the request (print request) from the client terminal 30.

FIG. 4 is a sequence diagram when a device (printer) under the control of the device server 201 fails during operation in response to the request (print request) from the client terminal 30. In FIG. 4, the signal SA, the signal SBa, the signal SCa, the signal SDa, the signal SEa, the signal SHa, the processing PAa, and the processing PBa are the same as the signals or processing of the same reference numerals described with reference to FIG. 3. Therefore, a description thereof will be omitted here.

When a failure such as a paper jam or a paper out occurs during the processing PBa, that is, the printing of the print data, the printer outputs an event notification signal SIa indicating occurrence of a failure to the device server 201. Upon receiving the event notification signal SIa, the device server 201 determines another device server serving as a substitution for processing PCm. Specifically, the device server 201 determines, as a substitution device server, the device server 202 identified by the server ID set to the first priority in the substitution table 231.

The device server 201 transmits a substitution print request signal SJa to the other device server 202 serving as a substitution via the network NW. The substitution print request signal SJa is sent to the device server 202 via the network NW. The substitution print request signal SJa includes print data.

Upon receiving the substitution print request signal SJa, the device server 202 outputs an inquiry signal SBb to the printer from a device interface, for example, the device interface 25 to which the printer is locally connected. Upon receiving the inquiry signal SBb, the printer outputs a response signal SCb to the inquiry to the device server 202. Specifically, the printer outputs a permission response signal SCb when the printer is neither in failure nor in operation. When the printer is in failure or in operation, the printer outputs a response signal SCb indicating an error.

When the response signal SCb indicating an error is received from the printer, the device server 202 transmits a response signal SHb indicating a request failure to the device server 201, which is a transmission source of the substitution print request signal SJa.

When the permission response signal SCb is received from the printer, the device server 202 outputs a print method signal SDb from the device interface 25 to the printer. The print method signal SDb includes print data. The printer stores the print data in the print buffer as processing PAb. Then, after storing the print data in the print buffer, the printer outputs an event notification signal SEb indicating the start of the printing to the device server 202. Further, the printer executes printing of the print data stored in the print buffer as processing PBb.

When the printer normally ends the printing, the printer outputs an event notification signal SFb indicating the end of the printing to the device server 202. Upon receiving the event notification signal SFb, the device server 202 transmits a response signal SGb indicating success of a request to the device server 201, which is the transmission source of the substitution print request signal SJa.

After transmitting the substitution print request signal SJa to the device server 202, the device server 201 waits for a response signal from the device server 202. Here, when the response signal SHb indicating the request failure is received, the device server 201 determines the next substitution device server as processing PCn. Specifically, the device server 201 determines, as a substitution device server, the device server 203 identified by the server ID set to the second priority in the substitution table 231. The device server 201 transmits the substitution print request signal SJa to the other device server 203 serving as a substitution via the network NW. In the device server 203 that receives the substitution print request signal SJa, the same sequence as that of the device server 202 described above is executed.

On the other hand, when the response signal SGb indicating the success of the request is received, the device server 201 transmits a response signal SKa indicating success of a request to the client terminal 30, which is the transmission source of the print request signal SA. The response signal SKa includes information indicating that the printer that executes printing is a printer controlled by the other device server 202. Based on the information, the client terminal 30 that receives the response signal SGa indicating the success of the request notifies that printing is executed by the printer under the control of the device server 202 of a transfer destination, instead of the device server 201 of a request destination. Therefore, the user of the client terminal 30 can know that the receipt is printed from the printer under the control of the device server 202.

When the failure of the printer is resolved and the printer is recovered by a work PD of a worker for the printer under the control of the device server 201, the printer outputs an event notification signal SL of normal recovery to the device server 201. When the signal SL is received from the printer, the device server 201 outputs a clear signal SM of the print buffer to the printer. Upon receiving the clear signal SM, the printer clears the print buffer. Then, the printer outputs a response signal SN to the device server 201. Upon receiving the response signal SN, the device server 201 outputs a print request signal SO including print data for invalid printing to the printer. The print data for the invalid printing is set in advance in the main memory 22 or the auxiliary storage device 23.

Upon receiving the print request signal SO, the printer performs invalid printing as processing PE. As a result, printing indicating that the immediately preceding printed matter is invalid is executed. Then, when the printing is completed, the printer outputs a response signal SP to the device server 201. Upon receiving the response signal SP, the device server 201 resumes control assuming that the printer is recovered. The above is a sequence when the device (printer) under the control of the device server 201 fails during the operation in response to the request (print request) from the client terminal 30.

The sequences illustrated in FIGS. 3 and 4 are implemented by the processor 21 of each device server 20 executing information processing according to the flowcharts illustrated in FIGS. 5 to 8. Therefore, next, a procedure of main information processing of the processor 21 will be described.

Figure 5:
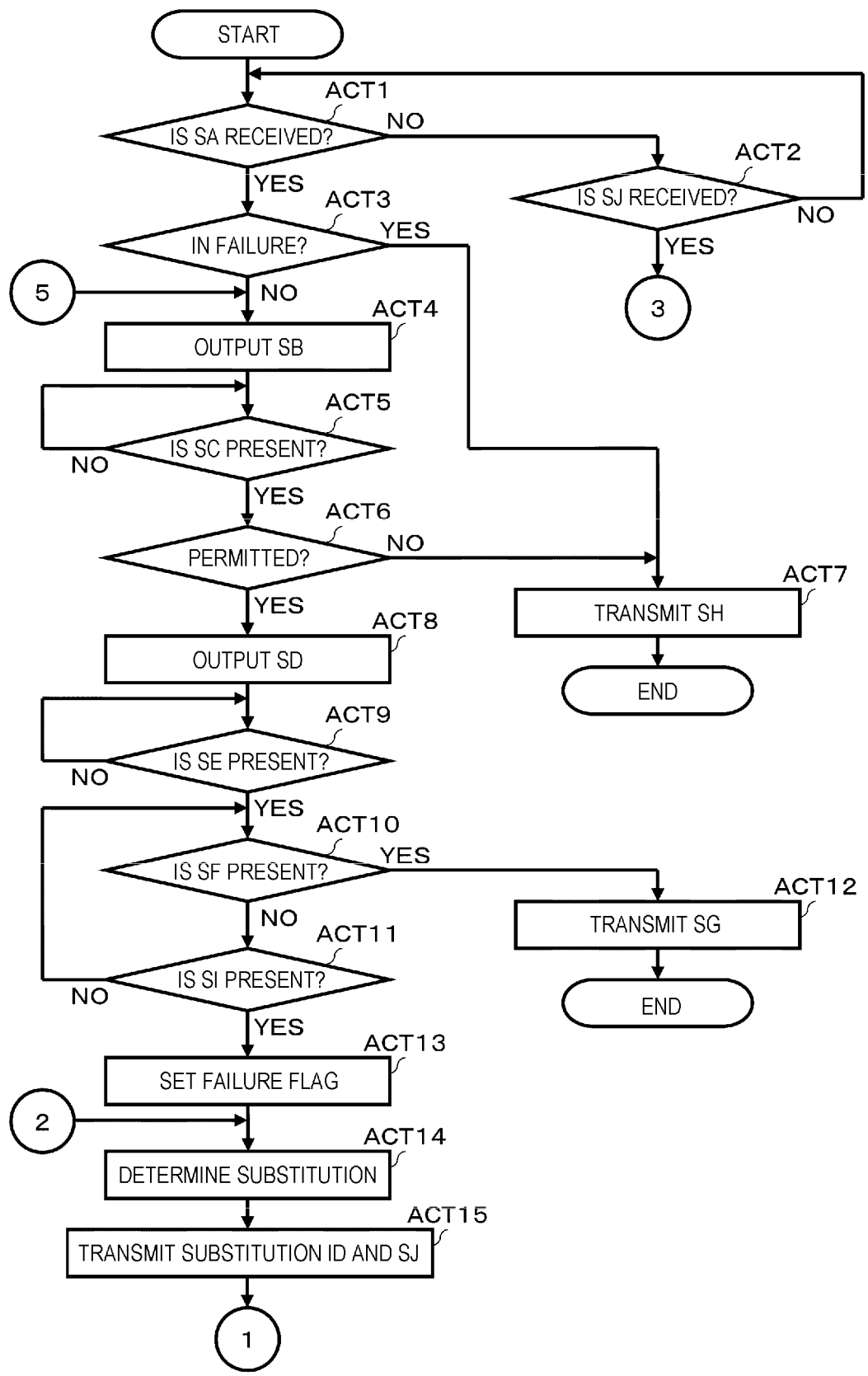
FIG. 5 is a flowchart illustrating a procedure of main information processing executed by a processor of the device server according to a control program.

First, the processor 2*l* confirms whether the print request signal SA is received from the client terminal 30 as ACT 1 in FIG. 5. If the print request signal SA is not received, the processor 21 proceeds from ACT 1 to ACT 2. In ACT 2, the processor 21 confirms whether the substitution print request signal SJ is received from the other device server 20. If the substitution print request signal SJ is not received, the processor 2*l* returns from ACT 2 to ACT 1. As described above, in ACT 1 and ACT 2, the processor 21 waits for the reception of the print request signal SA or the reception of the substitution print request signal SJ.

In the wait state of ACT 1 and ACT 2, for example, when the device server 201 receives the print request signal SA from the client terminal 30, the processor 21 of the device server 201 proceeds from ACT 1 to ACT 3. In ACT 3, the processor 21 confirms whether the printer is in failure. As will be described in the processing described later, a failure flag is set when the printer is in failure. The processor 21 checks the failure flag to confirm whether the printer is in failure.

If the printer is in failure, the processor 21 proceeds from ACT 3 to ACT 7. In ACT 7, the processor 21 transmits a response signal SH indicating a request failure from the communication interface 24 to the client terminal 30. Then, the processor 21 ends the information processing.

On the other hand, if the printer is not in failure, the processor 21 proceeds from ACT 3 to ACT 4. In ACT 4, the processor 21 outputs the inquiry signal SB from the device interface 25 to the printer. Then, in ACT 5, the processor 21 waits for a response signal SC from the printer. If the response signal SC is received via the device interface 25, the processor 21 proceeds from ACT 5 to ACT 6. In ACT 6, the processor 21 determines whether the response signal is a permission response signal SC or a response signal SC indicating an error. If the response signal is the response signal SC indicating the error, the processor 21 proceeds from ACT 6 to ACT 7. In ACT 7, the processor 21 transmits the response signal SH indicating the request failure to the client terminal 30 via the communication interface 24. Then, the processor 21 ends the information processing.

If the response signal from the printer is the permission response signal SC, the processor 21 proceeds from ACT 6 to ACT 8. In ACT 8, the processor 21 outputs a print method signal SD from the device interface 25 to the printer. The print method signal SD includes print data received from the client terminal 30. As described above, the processor 21 functions as the first control unit 211 by executing the processing of ACT 4 to ACT 6 and ACT 8.

In ACT 9, the processor 21 waits for a response signal SE from the printer. If the response signal SE is received via the device interface 25, the processor 21 proceeds from ACT 9 to ACT 10. In ACT 10, the processor 21 confirms whether the event notification signal SF indicating the end of the printing is received from the printer. If the event notification signal SF is not received, the processor 2*l* proceeds from ACT 10 to ACT 11. In ACT 11, the processor 21 confirms whether the event notification signal SI indicating the error is received from the printer. If the event notification signal SI indicating the error is not received via the device interface 25, the processor 21 returns from ACT 11 to ACT 10. As described above, in ACT 10 and ACT 11, the processor 21 waits for the input of the event notification signal SF indicating the end of the printing or the input of the event notification signal SI indicating the error.

In the wait state of ACT 10 and ACT 11, if the event notification signal SF indicating the end of the printing is received, the processor 21 proceeds from ACT 10 to ACT 12. In ACT 12, the processor 21 transmits a response signal SG indicating success of a request to the client terminal 30 via the communication interface 24. Then, the processor 21 ends the information processing.

In the wait state of ACT 10 and ACT 11, if the event notification signal SI indicating the error is received, the processor 21 proceeds from ACT 11 to ACT 13. In ACT 13, the processor 21 sets the failure flag to "1". The failure flag is 1-bit data stored in the volatile memory area of the main memory 22. The failure flag is set to "0" in a default state, and is set to "1" when a failure occurs in the device. As described above, the processor 21 functions as the detection unit 212 by executing the processing of ACT 11 and ACT 13.

If the failure flag is set in ACT 13, the processor 21 proceeds from ACT 13 to ACT 14. In ACT 14, the processor 21 determines another device server 20 as a substitution. That is, the processor 21 refers to the substitution table 231, and determines, as a substitution device server, the device server 202 specified by a server ID of a substitution 1 ID having the first priority order. Then, in ACT 15, the processor 21 transmits the substitution print request signal SJ via the communication interface 24 to the server ID of the substitution 1 ID as a destination. The substitution print request signal SJ includes print data received from the client terminal 30. Further, the substitution print request signal SJ also includes the server ID of the device server 201 as a transmission source ID. As described above, the processor 21 functions as the determination unit 213 by executing the processing of ACT 14. Further, the processor 21 functions as the transfer unit 214 by executing the processing of ACT 15.

Figure 6:
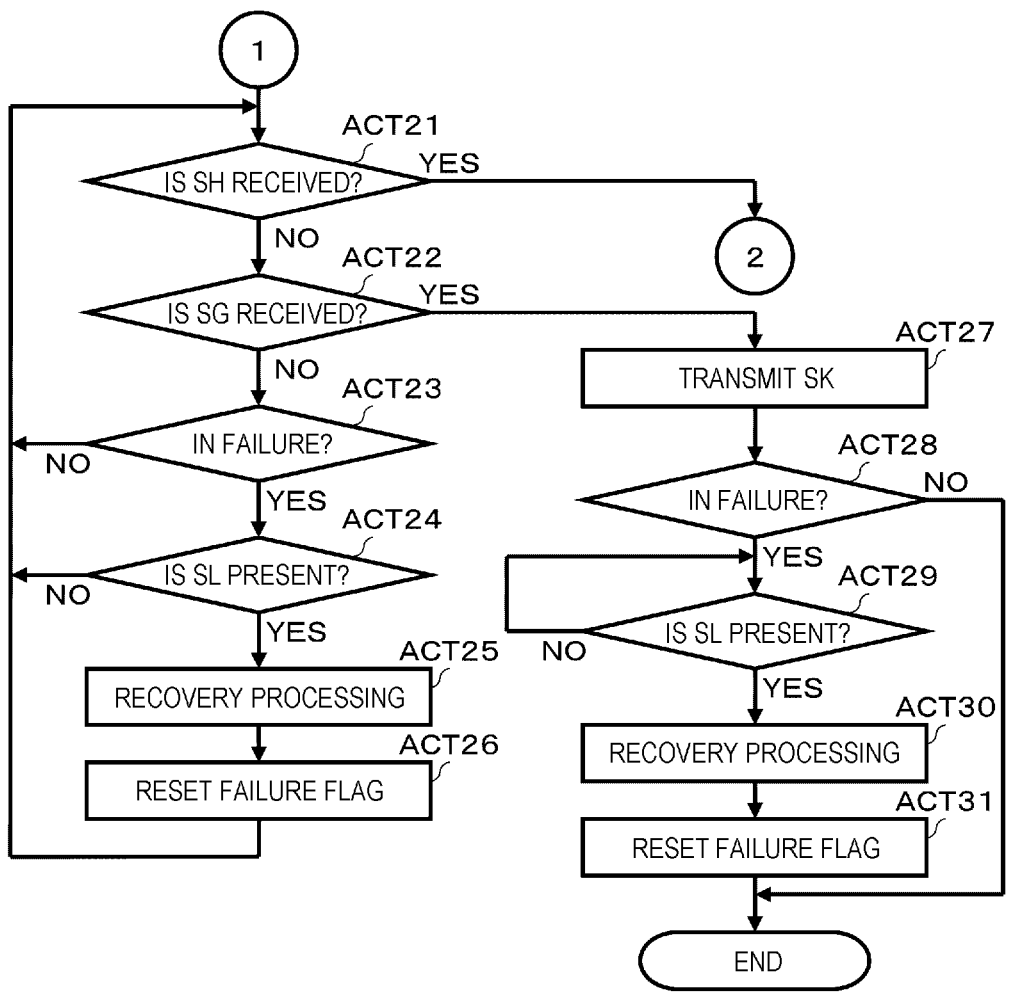
FIG. 6 is a flowchart illustrating a procedure of the main information processing executed by the processor of the device server according to the control program.

After transmitting the substitution print request signal SJ, the processor 21 proceeds from ACT 15 to ACT 21 in FIG. 6. In ACT 21, the processor 21 confirms whether the response signal SH indicating the request failure is received from the other device server 20. If the response signal SH indicating the request failure is not received, the processor 21 proceeds from ACT 21 to ACT 22. In ACT 22, the processor 21 confirms whether the response signal SG indicating the success of the request is received from the other device server 20. If the response signal SG indicating the success of the request is not received, the processor 21 proceeds from ACT 22 to ACT 23. In ACT 23, the processor 21 confirms whether the printer is recovered. When the failure flag is set to "1", the printer is not recovered. In this case, the processor 21 proceeds from ACT 23 to ACT 24. In ACT 24, the processor 21 confirms whether the event notification signal SL indicating normal recovery is received from the printer. If the event notification signal SL is not received, the processor 21 returns from ACT 24 to ACT 21. If the failure of the printer is not recovered as described above, in ACT 21 to ACT 24, the processor 21 waits for the reception of the response signal SH indicating the request failure or the response signal SG indicating the success of the request from the other device server 20 or the reception of the event notification signal SL indicating the normal recovery from the printer.

In the wait state of ACT 21 to ACT 24, if the event notification signal SL indicating the normal recovery is received via the device interface 25, the processor 21 proceeds from ACT 24 to ACT 25. The processor 21 executes the recovery processing in ACT 25. That is, the processor 21 outputs the clear signal SM of the print buffer to the printer, and then outputs a print request signal SO from the device interface 25. When the recovery processing is ended in this way, the processor 21 proceeds from ACT 25 to ACT 26. The processor 21 resets the failure flag to "0" in ACT 26. As described above, the processor 21 functions as the recovery processing unit 218 by executing ACT 25 and ACT 26.

When the failure flag is reset, the processor 21 returns from ACT 26 to ACT 21. Therefore, the processor 21 enters a wait state. The failure flag is not set. In this case, the processor 21 returns from ACT 23 to ACT 21. That is, in ACT 21 and ACT 22, the processor 21 enters the wait state of the response signal SH indicating the request failure or the response signal SG indicating the success of the request from the device server 202.

In the wait state of ACT 21 to ACT 24 or ACT 21 and ACT 22, if the processor 21 receives the response signal SH indicating the request failure from the other device server 202 via the communication interface 24, the processor 21 returns from ACT 21 to ACT 14 of FIG. 5. In ACT 14, the processor 21 determines the device server 203 identified by a server ID of a substitution 2 ID as the next substitution device server 20. Then, the processor 21 transmits the substitution print request signal SJ via the communication interface 24 to the server ID of the substitution 2 ID as a destination. Thereafter, the processor 21 enters the wait state of ACT 21 to ACT 24 or ACT 21 and ACT 22.

In the wait state of ACT 21 to ACT 24 or ACT 21 and ACT 22, when the processor 21 receives the response signal SG indicating the success of the request from the other device server 202 via the communication interface 24, the processor 21 proceeds from ACT 22 to ACT 27. In ACT 27, the processor 21 transmits a response signal SK indicating success of a request to the client terminal 30 via the communication interface 24. The response signal SKa includes information indicating that the printer used for printing is the other device server 202. As described above, the processor 21 functions as the second notification unit 217 by executing the processing of ACT 27.

Thereafter, in ACT 28, the processor 21 confirms whether the printer is recovered. When the failure flag is reset to "0", the printer is recovered. In this case, the processor 21 skips the processing of ACT 29 to ACT 31 to be described later, and ends the information processing.

By contrast, when the failure flag is set to "1", since the printer is not recovered, the processor 21 proceeds from ACT 28 to ACT 29. In ACT 29, the processor 21 waits for the event notification signal SL indicating the normal recovery from the printer. If the event notification signal SL is received via the device interface 25, the processor 21 proceeds from ACT 29 to ACT 30. Then, in ACT 30, the processor 21 executes the recovery processing similar to that of ACT 25. Then, when the recovery processing is ended, the processor 21 resets the failure flag to "0" in ACT 31. Then, the processor 21 ends the information processing. As described above, the processor 21 also functions as the recovery processing unit 218 when the processing in ACT 30 and ACT 31 is executed.

Figure 7:
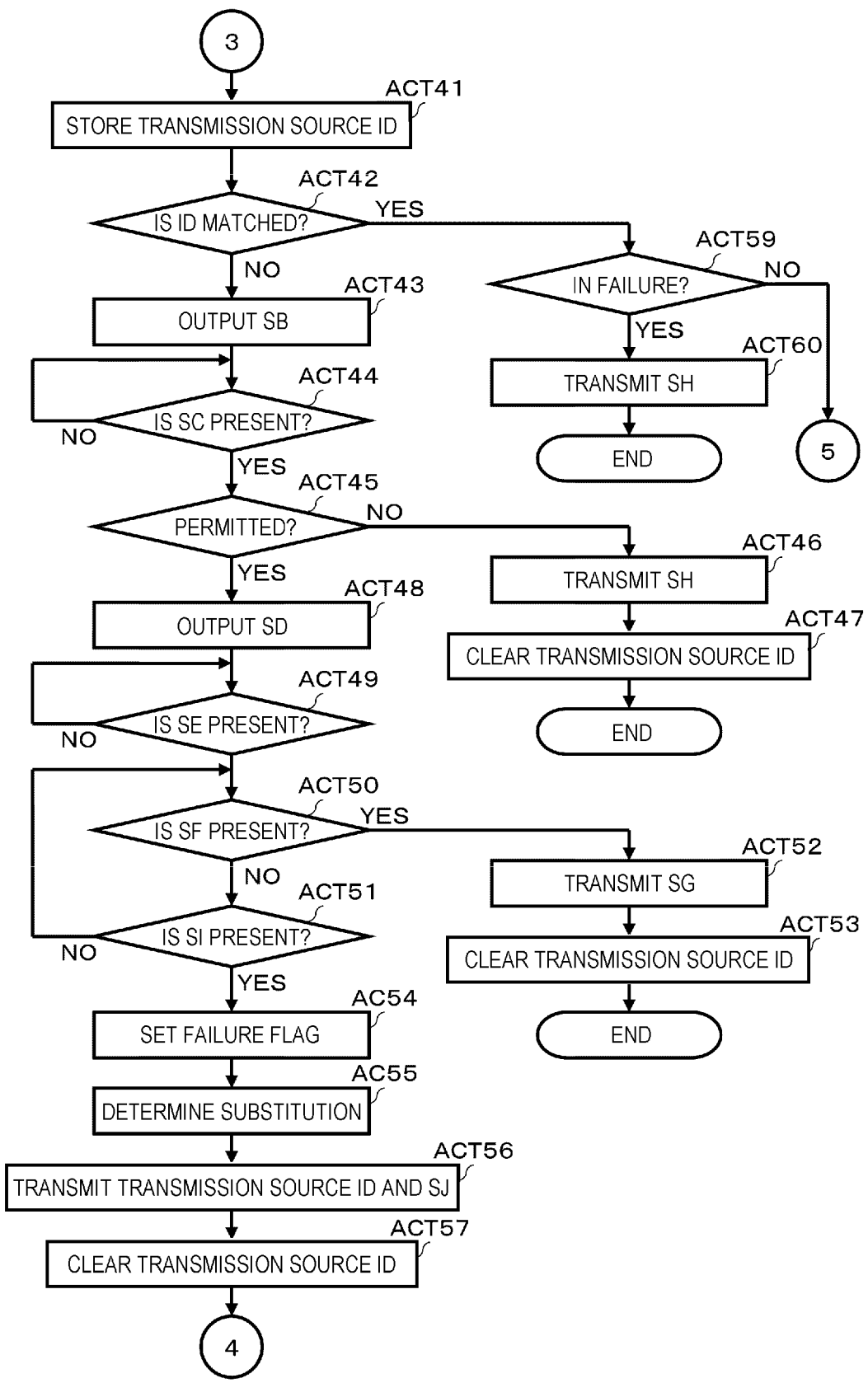
FIG. 7 is a flowchart illustrating a procedure of the main information processing executed by the processor of the device server according to the control program.
Figure 8:
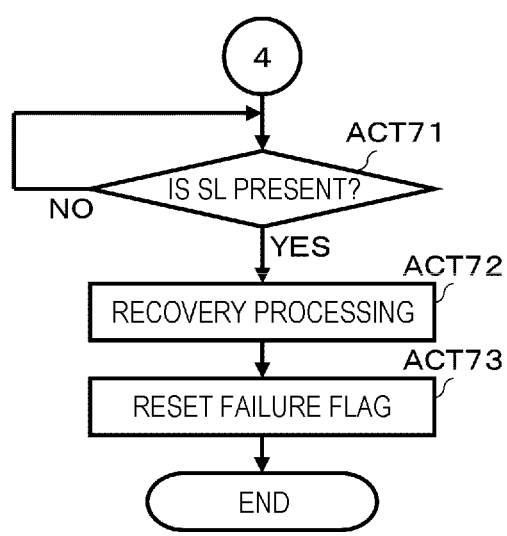
FIG. 8 is a flowchart illustrating a procedure of the main information processing executed by the processor of the device server according to the control program.

In the wait state of ACT 1 and ACT 2 in FIG. 5, when the substitution print request signal SJ is received from another device server 20, the processor 21 proceeds from ACT 2 to ACT 41 in FIG. 7. In ACT 41, the processor 21 stores the server ID included as the transmission source ID in the substitution print request signal SJ into a transmission source ID memory. The transmission source ID memory is, for example, a part of the volatile memory area in the main memory 22.

In ACT 42, the processor 21 confirms whether the server ID stored in the transmission source ID memory matches the server ID of the device server. Although details will be described later, the server ID stored in the transmission source ID memory may match the server ID of the device server 20. In this case, the processor 21 proceeds from ACT 42 to ACT 59. In ACT 59, the processor 21 confirms whether the printer controlled by the processor 21 is still in failure. When the failure flag is set to "1", the printer is in failure. If the printer is in failure, the processor 21 proceeds from ACT 59 to ACT 60. In ACT 60, the processor 21 transmits the response signal SH indicating the request failure from the communication interface 24 to the client terminal 30. Then, the processor 21 ends the information processing.

By contrast, when the failure flag is "0", that is, when the failure of the printer is recovered, the processor 21 proceeds from ACT 59 to ACT 4 in FIG. 5. Then, the processor 21 executes the processing after ACT 4 in the same manner as described above.

On the other hand, if the server ID stored in the transmission source ID memory does not match the server ID of the device server 20, the processor 21 proceeds from ACT 42 to ACT 43. In ACT 43, The processor 21 outputs the inquiry signal SB via the device interface 25. Then, in ACT 44, the processor 21 waits for the response signal SC from the printer. When the response signal SC is received via the device interface 25, the processor 21 proceeds from ACT 44 to ACT 45. In ACT 45, the processor 21 determines whether the response signal is the permission response signal SC or the response signal SC indicating the error. If the response signal is the response signal SC indicating the error, the processor 21 proceeds from ACT 45 to ACT 46. In ACT 46, the processor 21 transmits the response signal SH indicating the request failure to the device server 20 identified by the server ID stored in the transmission source ID memory via the communication interface 24. Further, in ACT 47, the processor 21 clears the transmission source ID memory. Then, the processor 2l ends the information processing.

If the response signal is the permission response signal SC, the processor 21 proceeds from ACT 45 to ACT 48. In ACT 48, the processor 21 outputs the print method signal SD via the device interface 25. The print method signal SD includes the print data included in the substitution print request signal SJ. As described above, the processor 2l functions as the second control unit 215 by executing the processing of ACT 43 to ACT 45 and ACT 48.

In ACT 49, the processor 21 waits for the response signal SE from the printer. When the response signal SE is received via the device interface 25, the processor 21 proceeds from ACT 49 to ACT 50. In ACT 50, the processor 21 confirms whether the event notification signal SF indicating the end of the printing is received from the printer. If the event notification signal SF is not received, the processor 2l proceeds from ACT 50 to ACT 51. In ACT 51, the processor 21 confirms whether the event notification signal SI indicating the error is received from the printer. If the event notification signal SI indicating the error is not received, the processor 21 returns from ACT 51 to ACT 50. As described above, in ACT 50 and ACT 51, the processor 21 waits for the reception of the event notification signal SF indicating the end of the printing or the reception of the event notification signal SI indicating the error.

In the wait state of ACT 50 and ACT 51, if the event notification signal SF indicating the end of the printing is received via the device interface 25, the processor 21 proceeds from ACT 50 to ACT 52. In ACT 52, the processor 21 transmits the response signal SG indicating the success of the request to the device server 20 identified by the server ID stored in the transmission source ID memory via the communication interface 24. Further, in ACT 53, the processor 21 clears the transmission source ID memory. Then, the processor 21 ends the information processing. As described above, the processor 21 functions as the first notification unit 216 by executing the processing of ACT 52.

In the wait state of ACT 50 and ACT 51, if the event notification signal SI indicating the error is received via the device interface 25, the processor 21 proceeds from ACT 51 to ACT 54. In ACT 54, the processor 21 sets the failure flag to "1". Further, in ACT 55, the processor 21 determines the other device server 20 as a substitution. That is, the processor 21 refers to the substitution table 231, and determines, as a substitution device server, a device server 20 specified by the server ID of the substitution 1 ID having the first priority order. Then, in ACT 56, the processor 21 transmits the substitution print request signal SJ via the communication interface 24 to the server ID of the substitution 1 ID as a destination. The substitution print request signal SJ includes the print data included in the substitution print request signal SJ received from the other device server 20. Further, the substitution print request signal SJ includes the server ID stored in the transmission source ID memory as the transmission source ID. As described above, the processor 21 functions as the detection unit 212 by executing the processing of ACT 51 and ACT 54. Further, the processor 21 functions as the determination unit 213 by executing the processing of ACT 55. Further, the processor 21 functions as the transfer unit 214 by executing the processing of ACT 56.

Incidentally, after receiving the substitution print request signal SJ, the other device server 20 executes the processing after ACT 41 described above. Therefore, for example, when the printer under the control of the device server 201 fails during operation and the substitution print request signal SJ is output from the device server 201 to the device server 202, but the printer under the control of the device server 202 fails, the substitution print request signal SJ is output from the device server 202 to the device server 203. However, when the printer under the control of the device server 203 is also in failure, the substitution print request signal SJ is output from the device server 203 to the device server 201. In this case, in ACT 42, the server ID stored in the transmission source ID memory matches the server ID of the device server.

After transmitting the substitution print request signal SJ in ACT 56, the processor 21 clears the transmission source ID memory in ACT 57. Then, the processor 21 proceeds to ACT 71 in FIG. 8. In ACT 71, the processor 21 waits for the event notification signal SL indicating the normal recovery from the printer. If the event notification signal SL is received via the device interface 25, the processor 21 proceeds from ACT 71 to ACT 72. In ACT 72, the processor 21 executes the same recovery processing as ACT 25 or ACT 30. Then, when the recovery processing is ended, the processor 21 resets the failure flag to "0" in ACT 73. Then, the processor 21 ends the information processing. As described above, the processor 2l also functions as the recovery processing unit 218 when the processing in ACT 72 and ACT 73 is executed.

[Function and Effect of Device Server]

As described above in detail, according to the device server 20 including the processor 21 functioning as the first control unit 211, the detection unit 212, the transfer unit 214, and the second control unit 215, a device under control can be operated in response to a device use request from the client terminal 30. In addition, when a failure occurs in the device during operation, the device use request can be transferred from the client terminal 30 to the other connected device server 20 via the network NW. On the other hand, when the device use request is received from the other device server 20, the device under control can be operated in response to the device use request. Therefore, when the device that the client terminal 30 intends to use fails during operation, processing is executed by a device under the control of the other device server 20. Then, a processing result of the device executed by the other device server 20 is returned to the client terminal 30. That is, an error is not returned to the client terminal 30 even if a failure occurs in the device under the control of the device server 20 in which the device use request is performed. Therefore, a load on the client terminal 30 can be reduced.

Further, the processor 21 has a function as the determination unit 213. Then, by the function, one device server 20 satisfying a predetermined condition from at least two other device servers 20 is determined as a transfer destination of the device use request. Therefore, for example, by setting the condition to one with a shorter physical distance with respect to the device server 20 of a transfer source, another device server located closest to the device server 20 of the transfer source can be determined as a substitution destination. As a result, since a device under control is generally present near the device server 20, an operation corresponding to a use request from the client terminal 30 is executed by a device near the device in failure. For example, when the device is a printer, the user of the client terminal 30 goes to take a printed matter, but since the printed matter is issued from another printer located near the assumed printer, the user is rarely requested to search for the printer from which the printed matter is issued.

In addition, the processor 21 has a function as the first notification unit 216 and the second notification unit 217. With these functions, when an operation corresponding to the device use request from the client terminal 30 is executed by a device under the control of the other device server 20, the client terminal 30 is notified that the operation is executed by the device under the control of the other device server 20. Therefore, the user of the client terminal 30 can easily know that the device under the control of which device server is in operating.

[Modification]

In the above-described embodiment, the physical distance is exemplified as a condition for determining a substitution device server. The condition is not limited to the distance. For example, even the same device may have a difference in capability. In such a case, a device server that controls a device having the same capability may be preferentially determined as a substitution server.

In addition, although several embodiments are described, these embodiments are presented as examples and are not intended to limit scopes of the disclosure. These new embodiments can be implemented in other various forms, and various omissions, replacements, and changes can be made without departing from the spirit of the disclosure. The accompanying claims and their equivalents are intended to cover such forms or modifications as would fall within the scope of the disclosure.

What is claimed is:

1. A device control apparatus, comprising:
   a communication interface communicatively connected to one or more client terminals via a network;
   a device interface locally communicatively connected to at least one device;
   a first controller configured to operate the at least one device in response to a device use request from the one or more client terminals;
   a detector configured to detect a failure of the at least one device;
   a transfer processor configured to transfer, when a failure is detected in an operating device under control of the first controller, the device use request from the one or more client terminals to another device control apparatus connected via the network;
   a second controller configured to operate the at least one device in response to the request, when the device use request is received from the another device control apparatus via the communication interface, wherein at least three device control apparatuses are connected via the network; and
   a determination processor configured to determine one device control apparatus satisfying a predetermined condition from at least two other device control apparatuses when a failure is detected in an operating device under the control of the first controller, wherein the determination processor is configured to determine another device control apparatus when the device is unavailable in the one device control apparatus satisfying the predetermined condition.

2. The apparatus according to claim 1, further comprising:
   a first notifier configured to, when the operation of the at least one device under control of the second controller is completed, transmit, via the communication interface, an operation completion notification of the at least one device to the other device control apparatus; and
   a second notifier configured to transmit to the one or more client terminals via the communication interface, when the operation completion notification of the at least one device is received from the other device control apparatus via the communication interface, the operation completion notification of the at least one device together with information specifying the other device control apparatus.

3. The apparatus according to claim 1, further comprising:
   a recovery processor configured to execute recovery processing for invalidating an operation of the device under the control of the first controller when the at least one device in which the failure is detected is recovered.

4. The apparatus according to claim 1, wherein
   the transfer circuit is configured to transfer the device use request from the one or more client terminals to the other device control apparatus determined by the determination processor.

5. The apparatus according to claim 4, wherein the predetermined condition is that a first distance from the other device control apparatus to the device control apparatus is shorter than a second distance from a still other device control apparatus to the device control apparatus.

6. The apparatus according to claim 1, wherein the one or more client terminals include at least one of a tablet terminal, a smart phone, or a notebook computer.

7. The apparatus according to claim 1, wherein the one or more client terminals include a point of sale terminal.

8. The apparatus according to claim 1, wherein the at least one device includes at least one of a printer or an automatic coin dispensing machine.

9. The apparatus according to claim 1, wherein the failure includes at least one of a paper jam or paper out.

10. The apparatus according to claim 1, wherein the failure includes at least one of a coin jam or a coin shortage.

11. The apparatus according to claim 1, wherein the another device control apparatus has priority.

12. A method for causing a computer to function as a device control apparatus, the device control apparatus including a communication interface communicatively connected to one or more client terminals via a network and a device interface that is locally communicatively connected to at least one device, the method comprising:
   performing first control, by a first controller, of operating the at least one device in response to a device use request from the one or more client terminals;
   detecting, by a detector, a failure of the device;
   transferring, by a transfer circuit, when a failure is detected in an operating device under control of the first controller, the device use request from the one or more client terminals to another device control apparatus connected via the network;
   performing second control, by a second controller, of operating the device in response to the request, when the device use request is received from the other device control apparatus via the communication interface, wherein at least three device control apparatuses are connected via the network;
   determining, by a determination processor, one device control apparatus satisfying a predetermined condition from at least two other device control apparatuses when a failure is detected in an operating device under the control of the first controller; and
   determining, by the determination processor, another device control apparatus when the device is unavailable in the one device control apparatus satisfying the predetermined condition.

* * * * *